United States Patent
Roth

(10) Patent No.: US 10,423,810 B2
(45) Date of Patent: Sep. 24, 2019

(54) RFID RETAIL FLOOR ITEM CARRIAGE

(71) Applicant: AVERY DENNISON RETAIL INFORMATION SERVICES, LLC, Mentor, OH (US)

(72) Inventor: Mark Roth, North Miami, FL (US)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/983,334

(22) Filed: May 18, 2018

(65) Prior Publication Data

US 2018/0336383 A1 Nov. 22, 2018

Related U.S. Application Data

(60) Provisional application No. 62/507,881, filed on May 18, 2017.

(51) Int. Cl.
| | |
|---|---|
| *G06F 19/00* | (2018.01) |
| *G06K 7/10* | (2006.01) |
| *B62B 5/00* | (2006.01) |
| *G06K 19/07* | (2006.01) |

(52) U.S. Cl.
CPC ........ *G06K 7/10386* (2013.01); *B62B 5/0096* (2013.01); *G06K 7/10178* (2013.01); *G06K 7/10316* (2013.01); *G06K 19/0707* (2013.01); *G06K 19/0723* (2013.01)

(58) Field of Classification Search
USPC ........................................................ 235/385
See application file for complete search history.

(56) References Cited

U.S. PATENT DOCUMENTS

| | | |
|---|---|---|
| 9,208,362 B1 | 12/2015 | Fink et al. |
| 2006/0208072 A1* | 9/2006 | Ku .................. G06K 7/0008 235/383 |

FOREIGN PATENT DOCUMENTS

DE 102006043523 1/2008

OTHER PUBLICATIONS

International Search Report and Written Opinion of ISA/EPO prepared for PCT/US2018/033343 dated Aug. 21, 2018.

* cited by examiner

*Primary Examiner* — Jamara A Franklin
(74) *Attorney, Agent, or Firm* — Avery Dennison Retail Information Services, LLC

(57) ABSTRACT

An RFID-enabled retail carriage basket, which may be placed within a retail carriage or may be integrated into a retail carriage, such as a shopping cart. The RFID-enabled retail carriage basket may have a base with a near-field radio-frequency antenna, and sidewalls arranged around the perimeter of the base. RF-reflecting material may be attached to the lower part of the carriage basket, on the outside of the base and along the lowest parts of the sidewalls. RF-mitigating material may be attached to the remaining parts of the sidewalls. The RFID-enabled retail carriage basket may be connected to a host device, which may control scanning of the basket that may be performed by the antenna. If desired, the RFID-enabled retail carriage basket may be provided in the lower basket of a double-basket shopping cart and configured to scan both the upper and the lower basket with the antenna.

20 Claims, 13 Drawing Sheets

RFID RETAIL FLOOR ITEM CARRIAGE

CROSS REFERENCE TO RELATED APPLICATION(S)

The present application claims priority to and the benefit of U.S. Provisional Application No. 62/507,881 filed on May 18, 2017, which is incorporated herein by reference in its entirety.

BACKGROUND

An increasing number of businesses in all sectors of the economy have embraced the use of RFID technology. Inexpensive RFID tags can be attached to all kinds of goods and used to monitor their progress during manufacturing, shipment, and sale.

Retailers, in particular, have increasingly adopted RFID technology as a method by which they can track individual items in inventory, supplementing or even replacing the use of barcodes. By way of background, most retailers, specifically traditional "brick and mortar" locations that have significant real estate investments in physical store locations, are attempting to reinvent themselves. These retailers are defending their market share of a highly competitive environment by engaging in their own e-commerce businesses and changing the consumer experience with creative ways to entice the shopper into the store. Part of this reinvention is employing newer technology such as RFID to maintain higher inventory accuracy, and with the right solutions, provide more value to the consumer.

As RFID sees increasing adoption, some retailers may elect to use RFID to complement existing barcode technology, and others may elect to make a complete technology divesture of barcode technology and fully replace the use of barcodes for item identification. Retailers have relied on barcode technology for years as a means to automate processing of goods, and to enable faster and more accurate checkout processes. Barcodes are an optically dependent technology, meaning there must be some kind of optical scanning technology utilized to read and decode the various bars and spaces composing the barcode symbology.

A major advantage of RFID technology over barcode technology is that, with RFID, it is possible to interrogate an item without having to strategically position and place a barcode label or tag in front of a scanner as must be done with barcode reading. RFID does not depend on line of sight to gather information. If an item tagged with an RFID transponder is placed within an RF field, the transponder is excited and broadcasts its information. The term "tagged" is a general application meant to imply the item has been paired to an identifier. Unlike barcodes, RFID transponders or inlays may be embedded in the item, sewn into the item's own material, or bonded to the item in some fashion. This is something that is not possible—or, if possible, generally not desirable—with barcode technology, where the tag must be visible and accessible in order to be functional. A visible barcode that is permanently integrated into an item will generally impair the appearance of the item; this is not likely to be the case with RFID technology, because the RFID transponder can be much more easily hidden.

As more retailers embrace the use of RFID technologies, and subsequently implement individual item identification with RFID, new complimentary solutions must be developed to support the use of this technology.

SUMMARY

According to an exemplary embodiment, RFID technology may be deployed in order to simplify checkout, including, potentially, self-checkout. According to some exemplary embodiments, using RFID, items may be scanned and the customer may be charged without the need to individually scan every individual item.

In an exemplary embodiment, a radio-frequency identification (RFID)-enabled retail carriage basket, which may function as an insert for or may be integrated into a shopping cart or other retail carriage, may be provided, which may function to facilitate comprehensive RFID scanning. The retail carriage basket may be formed around an enclosure, which may include a base and a plurality of walls disposed around the perimeter of the base, the enclosure having at least one opening. The enclosure may further have a layer of RF-reflecting material (for example, MYLAR® film) coupled to the outside surface of the base. Materials may include any RF-reflecting material such as, but not limited, to aluminum foil, and other electrically conductive metals such as copper. Each of the walls may have a strip of radio frequency wave reflecting material coupled to a lower portion of an outside surface of the wall, and a layer of radio frequency wave mitigation material coupled to a portion of the outside surface of the wall not covered by the radio frequency wave reflecting material; this may be attached by lamination or by another attachment method known in the art. The base may further include a near-field radio-frequency antenna, pointed in a direction of the at least one opening; the antenna may be communicatively coupled to a host device, which may include a processor (which may be a microprocessor, such as a RASPBERRY PI or ARDUINO), a memory, and a power supply (which may be, for example, a battery charger).

In an exemplary embodiment, the retail carriage basket may include a display, which in one embodiment is a touch screen. In some embodiments, the display may be a display of another device, such as a smartphone or tablet, which may also be functional as the host device. In one embodiment presently contemplated by the present invention, the display may in fact be a smartphone or tablet connected to the carriage via an attachment mechanism such as a fastener device. In one embodiment the display communicates via Bluetooth or USB with the reader in the basket and the display is positioned on the handle of the container/retail carriage basket. In another embodiment the display may be integrated into the container/retail carriage basket.

In one embodiment, the RF antenna may be connected to the host device by a combination data and power cable, which may be, for example, a USB connection or a power-over-Ethernet connection.

In an exemplary embodiment, the host device may be configured to activate the antenna for a predetermined time period after motion is detected in the retail carriage basket, and may be configured to deactivate the antenna once the predetermined time period has passed. This may ensure that the antenna is activated when a user places an item within the basket, and is not otherwise kept on when it does not need to be.

In an exemplary embodiment, the retail carriage basket may include a micro switch, which may be configured to activate the antenna when the retail carriage basket is placed in a retail carriage, and may be configured to deactivate the antenna when the retail carriage basket is removed. This may ensure that items are not inadvertently added to the memory of the retail carriage basket host device when the retail carriage basket is not in use, and may ensure that power is saved. Removal may also, for example, clear the memory of the retail carriage basket host device, if desired.

In an exemplary embodiment, the structural part of the retail carriage basket (that is, the base and the plurality of walls) may be constructed as a single part. That is, according to an exemplary embodiment, the base and the plurality of walls may be a "tub" where the base and walls are contiguously formed. In another exemplary embodiment, the retail carriage basket may be connected from a plurality of parts, such as a base panel and a plurality of side panels, which may each attach to one another or may each be separately coupled to a retail carriage. This may allow a variety of retail carriage baskets to be used with a variety of retail carriages; in some cases, it may be desirable to refit a retail carriage to be an RFID-enabled retail carriage by fixedly coupling a retail carriage basket to the retail carriage, while in other cases, it may be desirable for the retail carriage basket to be a removable tub.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1A:
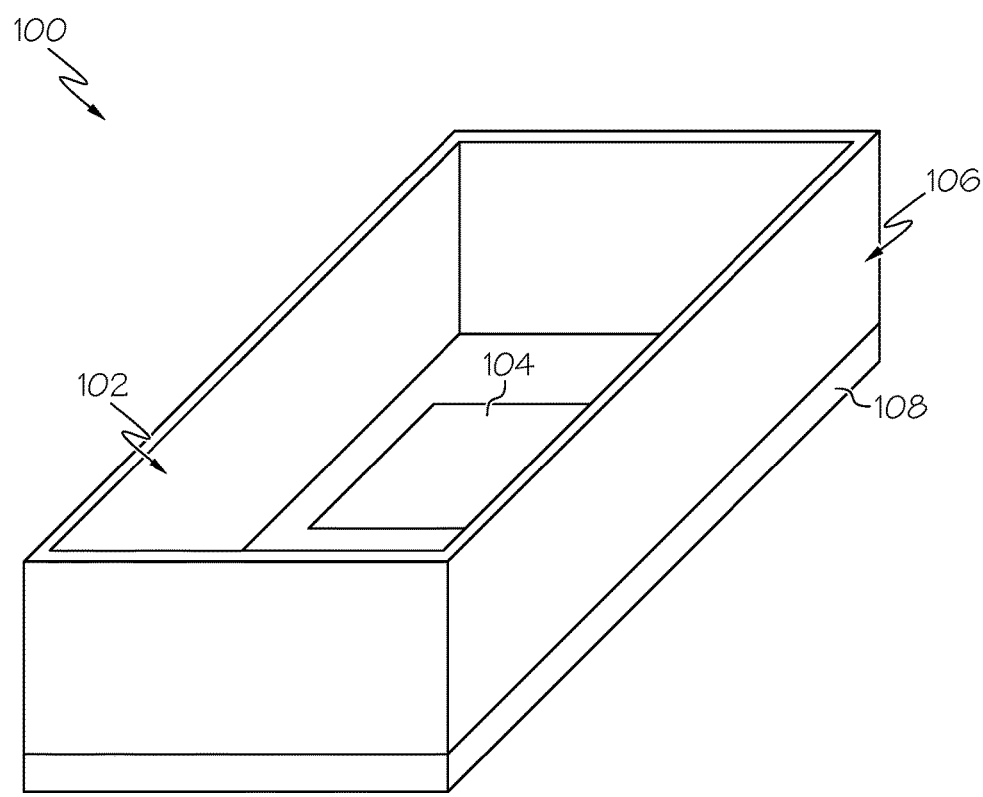
FIG. 1A is an exemplary embodiment of an RFID-enabled retail carriage basket.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of an RFID-enabled retail carriage, or an RFID-enabled basket for a retail carriage, may be disclosed. Such a basket may be used in a retail carriage or any of a variety of configurations of retail carriage.

The following disclosure may contain a number of embodiments of a retail carriage basket or any other container of objects that may allow or may facilitate comprehensive RFID scanning within the confines of a shopping cart or any other type of carriage/container. In the following disclosure, the term "retail carriage" may be used in order to better reflect the changing form factors of carts and other carriages that may be employed by retailers, in order to enhance the shopping experience. Retail carriages may be understood to be continuously evolving, and the formats and physical features of retail carriages may be adapted so that they do not resemble traditional wire-frame grocery shopping carts that have been in common use in the past.

Many different retail carriages may be in use by many different retailers, according to the specific needs of the retailers. Many of these retail carriages may be dramatically different from traditional designs. For example, according to some exemplary embodiments, some of these carts may be provided with a very small volume or capacity, while others of these carts (such as carts for "warehouse club" stores) may be provided with a larger than usual volume or capacity. In some exemplary embodiments, some of these carriages may have one or more removable baskets. In some exemplary embodiments, some of these carriages may be constructed from different materials, such as plastic, metal, more unusual materials such as canvas or wood (such as may be used in, for example, panel moving carts used in hardware stores), or a combination of two or more such materials.

In most such carriages, however, at least some parts of the frame will be formed from metal. While other materials, such as plastic, are easily permeated by radio waves and as such are conducive to being used with RFID, metal tends to block or reflect RF signal and as such typically presents more significant challenges. As such, the use of metal frames in an object that incorporates RFID technology (such as a retail carriage) typically requires more careful design and management of RF fields than would otherwise be the case in order for the RFID technology to be successfully used.

For example, in an RFID-enabled retail carriage, a problem that can arise has to do with constraining the size of the RFID read field so that it overlaps with the size of the retail carriage and does not extend outward past the confines of the retail carriage. If an RFID-enabled retail carriage is designed so that it has an antenna or series of antennas pointing into the retail carriage basket, the retail carriage may read tags that have been placed outside of the cart, which limits the utility of the RFID-enabled retail carriage. It must thus be understood that the successful design of an RFID-enabled retail carriage may not be implemented solely by sticking an antenna or series of antennas in the general confines of the cart and hoping the reading of RFID tags is simple.

According to an exemplary embodiment of an RFID-enabled retail carriage, the RFID-enabled retail carriage may be used in very close proximity to a number of other retail carriages which may store RFID-enabled goods, as well as in close proximity to shelves that may likewise store RFID-enabled goods. Because the carriages will be moving in very close proximity to items tagged "inventory" with RFID, an RFID field that is not carefully managed may risk inadvertently adding these items to the shopper's selection and purpose, which may possibly lead to situations like one shopper paying for the goods of another shopper that is in line next to them.

In some exemplary embodiments, it may be desired to refit existing shopping carts or other retail carriages rather than creating new retail carriages. In such embodiments, one such refit that may be used may be a removable basket which is RFID-enabled and may be added to the basket of a shopping cart (or other retail carriage) in order to make the basket of the shopping cart RFID-enabled. Such a refit configuration may compound the issues with constraining the RFID field to the boundaries of the cart; the antennas of the basket may be exposed fully to open air, and as such may gather reads of any items that come within their field of influence.

An RFID-enabled retail carriage basket, and an RFID-enabled retail carriage having a carriage basket, which may be used to reduce or eliminate the aforementioned issues may thus be described.

Turning now to exemplary FIG. 1A, FIG. 1A displays an exemplary embodiment of an RFID-enabled container, also referred to as a retail carriage basket 100. According to some exemplary embodiments, such an RFID-enabled retail carriage basket 100 may be incorporated into the design of a retail carriage basket; for example, in an exemplary embodiment, the RFID-enabled retail carriage basket 100 may be incorporated into the body of a newly manufactured shopping cart such that the shopping cart will be RFID-enabled. In other exemplary embodiments, an RFID-enabled retail carriage basket 100 may be removable from a retail carriage, such that the RFID-enabled retail carriage basket 100 can be added to an existing shopping cart and can be removed or replaced easily if necessary. In other exemplary embodiments, an RFID-enabled retail carriage basket 100 may be fitted with a handle and used as a hand-portable retail carriage basket. Other configurations of an RFID-enabled retail carriage basket 100 may also be understood. In yet another embodiment the container may be an unconventional type of carriage such as a shopping bag or pouch.

According to an exemplary embodiment, an RFID-enabled retail carriage basket 100 may have a structural liner 102. Structural liner 102 may be formed from any of a variety of acceptable materials. In an exemplary embodiment, structural liner 102 may be constructed from a hard plastic, such as PVC or a PVC foam board; in another exemplary embodiment, structural liner 102 may be constructed from any plastic or any structural material that does not reflect radio waves. In another exemplary embodiment, the structural liner may be constructed from wood or a combination of the example materials described above in addition to other structural materials that do not reflect radio waves.

In an exemplary embodiment, a structural liner 102 may comprise a bottom surrounded by a plurality of walls or a single rounded wall, as may be desired. In an exemplary embodiment, a structural liner may be a stand-alone basket, and may, for example, be formed from a single solid piece or multiple pieces fused together to form a single solid piece. In another exemplary embodiment, a structural liner 102 may be formed from two or more pieces, such as two or more panels that may be added to the sides of an existing shopping cart or other retail carriage.

According to an exemplary embodiment, at least one antenna 104 may be disposed within the structural liner 102. Antenna 104 may be, for example, any RF antenna that may be configured to read an RFID signature of an RFID chip. In an exemplary embodiment, the antenna 104 may be a custom near field RF antenna of very thin construction.

In an exemplary embodiment, the antenna 104 and the lower part of the structural liner 102 may provide a slightly elevated surface containing the antenna face, which may allow a proper read field to be generated. Antenna 104 may be, for example, disposed within the bottom of the structural liner 102 and configured to face upwards, toward an opening in the structural liner 102. In some exemplary embodiments, an antenna 104 may have one or more power or data cables which may extend from the structural liner 102, for example a lower panel of the structural liner 102, as may be desired. This may be connected to a host device, which may be configured to retransmit data that has been read by the antenna 104.

According to an exemplary embodiment, the lower part of the structural liner 102 which surrounds the antenna 104 may be surrounded by one or more interior panels. In an exemplary embodiment, interior panels may be formed from the same material as the lower part of the structural liner or may be formed as part of the same piece as the lower part of the structural liner 102. In another exemplary embodiment, the interior panels may be constructed from a different material, for example a material which mitigates RF more heavily or another different material from the lower part of the structural liner 102.

In an exemplary embodiment, the one or more interior panels may be fitted with RF mitigation material 106 that is configured to contain an RF field generated by the antenna 104 within the structural liner 102. In an exemplary embodiment, the RF mitigation material 106 may be laminated to the structural liner 102; in another exemplary embodiment, the RF mitigation material 106 may otherwise be provided in or on the interior panels, for example by being disposed within a slot in the structural liner 102. In an exemplary embodiment, the interior of the structural liner 102, the exterior of the structural liner 104, or both may be fitted with RF mitigation material 106, as may be desired.

According to an exemplary embodiment, the structural liner 102 may be fitted with a radio-reflective material 108 in order to selectively enhance the RF fields of the antenna 104 in one or more particular directions. In an embodiment, radio-reflective material 108 may be fitted to the structural liner 102 only over a limited area; for example, according to an exemplary embodiment, radio-reflective material 108 may be used to coat the bottom of the structural liner 102 but no other area of the structural liner 102. In some exemplary embodiments, the radio-reflective material 108 may be fitted to the structural liner 102 in a similar way to the RF mitigation material 108 (for example, by lamination) or may be fitted to the structural liner 102 or the RF mitigation material 108 in another way, such as may be desired.

In an exemplary embodiment, the RFID-enabled retail carriage basket 100 may include a micro-form-factor-format RFID reader with a combined power and data interface, such as a USB interface. This may allow the antenna 104 to derive power from a host device to which it is connected, thus allowing the antenna 104 to be operated without requiring a separate power supply cable be fitted to the antenna 104. In other exemplary embodiments, other combined power transmission and data transmission protocols may be substituted for a USB connection; for example, according to an exemplary embodiment, a power-over-Ethernet combined power transmission and data transmission protocol may be used in order to supply power to the reader antenna 104 from the host device.

Figure 1B:
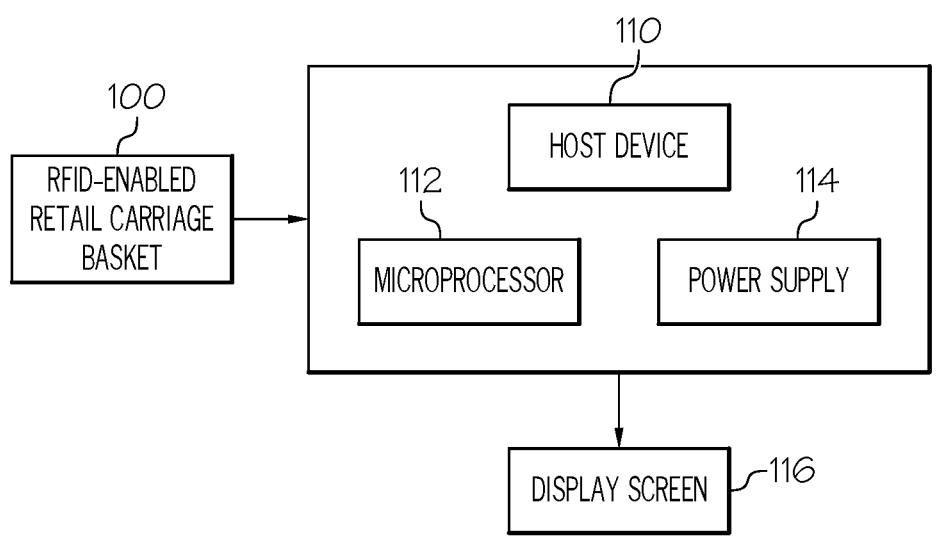
FIG. 1B is an exemplary block diagram of an exemplary embodiment of a RFID-enabled retail carriage basket system.

Turning now to exemplary FIG. 1B, FIG. 1B shows an exemplary embodiment of a system diagram for a RFID-enabled retail carriage basket system. According to an exemplary embodiment, an RFID-enabled retail carriage basket 100 may be coupled to a host device 1110, which may output to a display screen 116 by which a user can read the output of the host device 110.

According to an exemplary embodiment, an RFID-enabled retail carriage basket 100 may be controlled by a microprocessor 112. In an exemplary embodiment, microprocessor 112 may function as or may control a host device. In an exemplary embodiment, the microprocessor 112 may have a communication interface to the reader, and may have power docking capability.

In some exemplary embodiments, a microprocessor 112 may be or may be substituted for a multi-function device, such as a smart phone, other cell phone, a tablet, or another multipurpose computer system, as may be desired. In other exemplary embodiments, a microprocessor 112 may be a dedicated microprocessor, for example a microprocessor in one of the open architecture formats such as RASPBERRY PI or ARDUINO. In other exemplary embodiments, a microprocessor in another small yet powerful form factor may be provided, or any other microprocessor may be used.

In an exemplary embodiment, the microprocessor 112 may output to a display screen 116, which may be used for a user interface. In an exemplary embodiment, the display screen 116 may be a screen which does not require a separate keyboard, and may be, for example, a touch screen. In another exemplary embodiment, the display screen 116 may be provided along with a keyboard, mouse, or other input device, such as may be desired.

According to an exemplary embodiment, the host device 110 may include a power supply 114. In an exemplary embodiment, the power supply 114 may be one or more battery packs. In an exemplary embodiment, a battery pack or other power supply 114 may be docked with the host device 110 and may be configured to be removed or removable. In another exemplary embodiment, a battery pack or other power supply 114 may be permanently integrated with the host device 110, as may be desired.

In an exemplary embodiment, the power supply 114 of the host device 110 may include hardware that allows the power supply 114 to be recharged using at least one charging method. For example, according to an exemplary embodiment, the host device 110 may include a port that may be configured to receive a charging cable. In another exemplary embodiment, the host device 110 may be wirelessly charged through magnetic induction. In other exemplary embodiments, other methods of charging the host device 110 may be used.

In an exemplary embodiment, the host device 110 may include one or more power-saving features. For example, according to an exemplary embodiment, the host device 110 may be configured to perform field sensing motion detection to conserve power; when performing field sensing motion detection, field sensing may only be performed when motion is detected in the body of the carriage, which may indicate that one or more items have been placed into the carriage.

In an exemplary embodiment, the host device 110 may include a micro switch that may be configured to turn off the read function. According to an exemplary embodiment, this may be utilized to turn off the reader when the RFID-enabled retail carriage basket 100 is removed from the retail carriage, or when it is otherwise indicated that no further reading needs to be performed.

Figure 2:
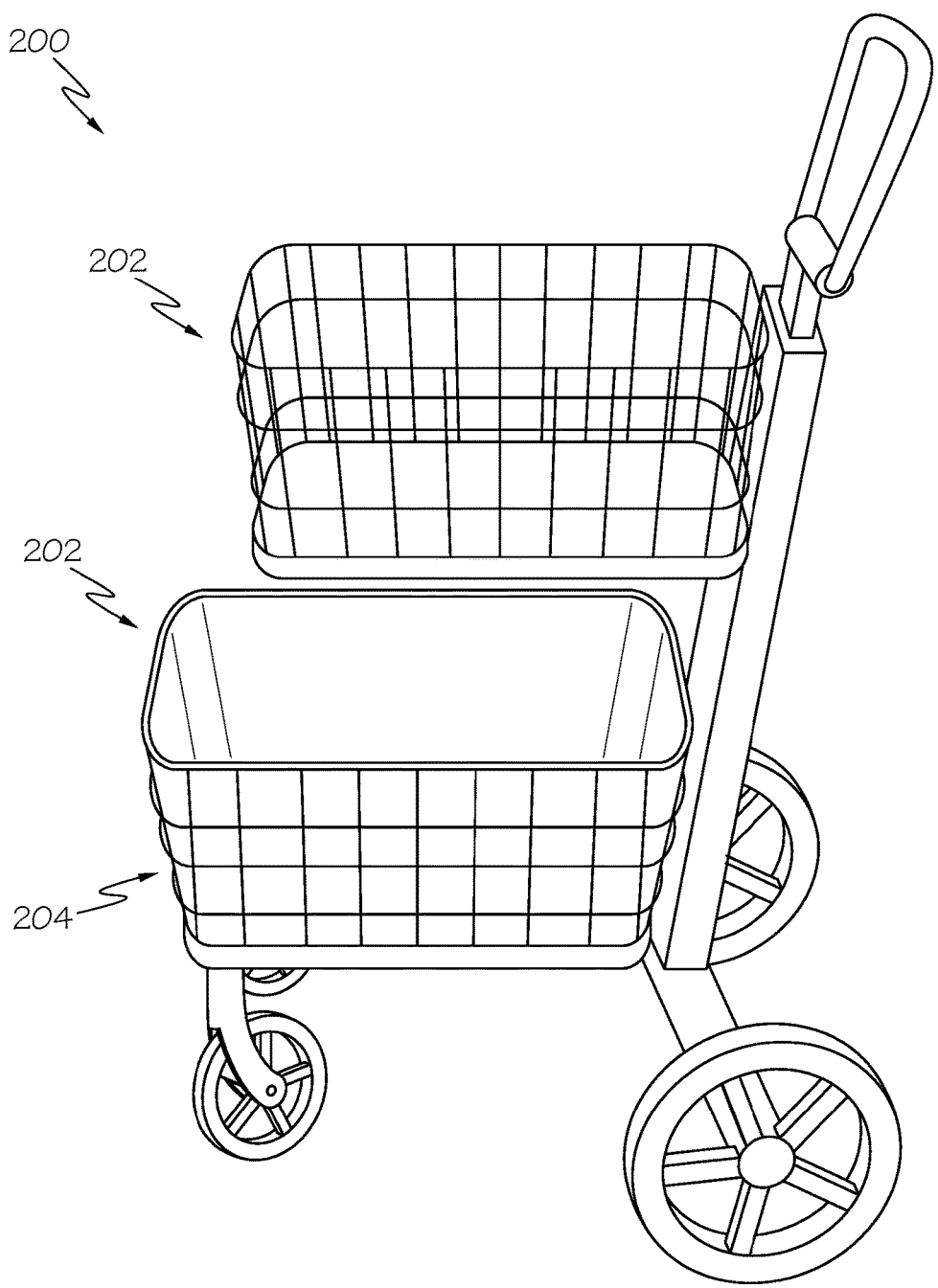
FIG. 2 is an exemplary embodiment of an RFID-enabled retail carriage having a removable carriage basket.

Turning now to exemplary FIG. 2, FIG. 2 shows an exemplary embodiment of a RFID-enabled retail carriage 200. In an exemplary embodiment, a RFID-enabled retail carriage 200 may be formed from a refitted retail carriage, and may include one or more baskets 202 and a RFID-enabled retail carriage basket 204, which may be sized to fit within the one or more baskets of the retail carriage. For example, in the exemplary embodiment shown in FIG. 2, the RFID-enabled retail carriage basket 204 may be sized to fit within the lower basket 202. In some exemplary embodiments, the RFID-enabled retail carriage basket 204 may be able to read the RFID tags of items in the lower basket and may also be able to read the RFID tags of items in the upper basket.

In the exemplary embodiment shown in exemplary FIG. 2, the RFID-enabled retail carriage basket 204 may be a single piece. This may allow it to be removed from the retail carriage 202, while retaining all of the material that has been placed within the RFID-enabled retail carriage basket 204, if desired. This may allow for alternative uses for or configurations of the RFID-enabled retail carriage basket 204.

For example, according to an exemplary embodiment, an RFID-enabled retail carriage basket 204 may be removed from the retail carriage and placed on a checkout counter before being read. The RFID-enabled retail carriage basket 204 may then be coupled to a host device on the checkout counter, or to elements of a host device on the checkout counter (such as an inductive charger disposed under the checkout counter), and the contents of the RFID-enabled retail carriage basket 204 may then be read. This may provide many of the advantages of having the RFID-enabled retail carriage basket 204 disposed within the cart, namely instantaneous reading of the RFID tags of all of the items in the RFID-enabled retail carriage basket 204, while allowing power to be provided to the RFID-enabled retail carriage basket 204 through the connection to the checkout counter rather than the use of a battery or other mobile power supply.

In another exemplary embodiment, it may be desired for customers to possess their own RFID-enabled retail carriage baskets 204 which they can bring into a retail store, similar to a reusable shopping bag. This may, for example, mitigate the costs of transitioning to the use of RFID over barcode systems, and may acclimate customers to the change. In such embodiments, or other embodiments in which the RFID-enabled retail carriage basket 204 is intended to be removed or is intended to function as a stand-alone device, the RFID-enabled retail carriage basket 204 may include one or more features to improve the ability of a user to carry the RFID-enabled retail carriage basket 204, such as one or more handles or one or more straps.

Figure 3:
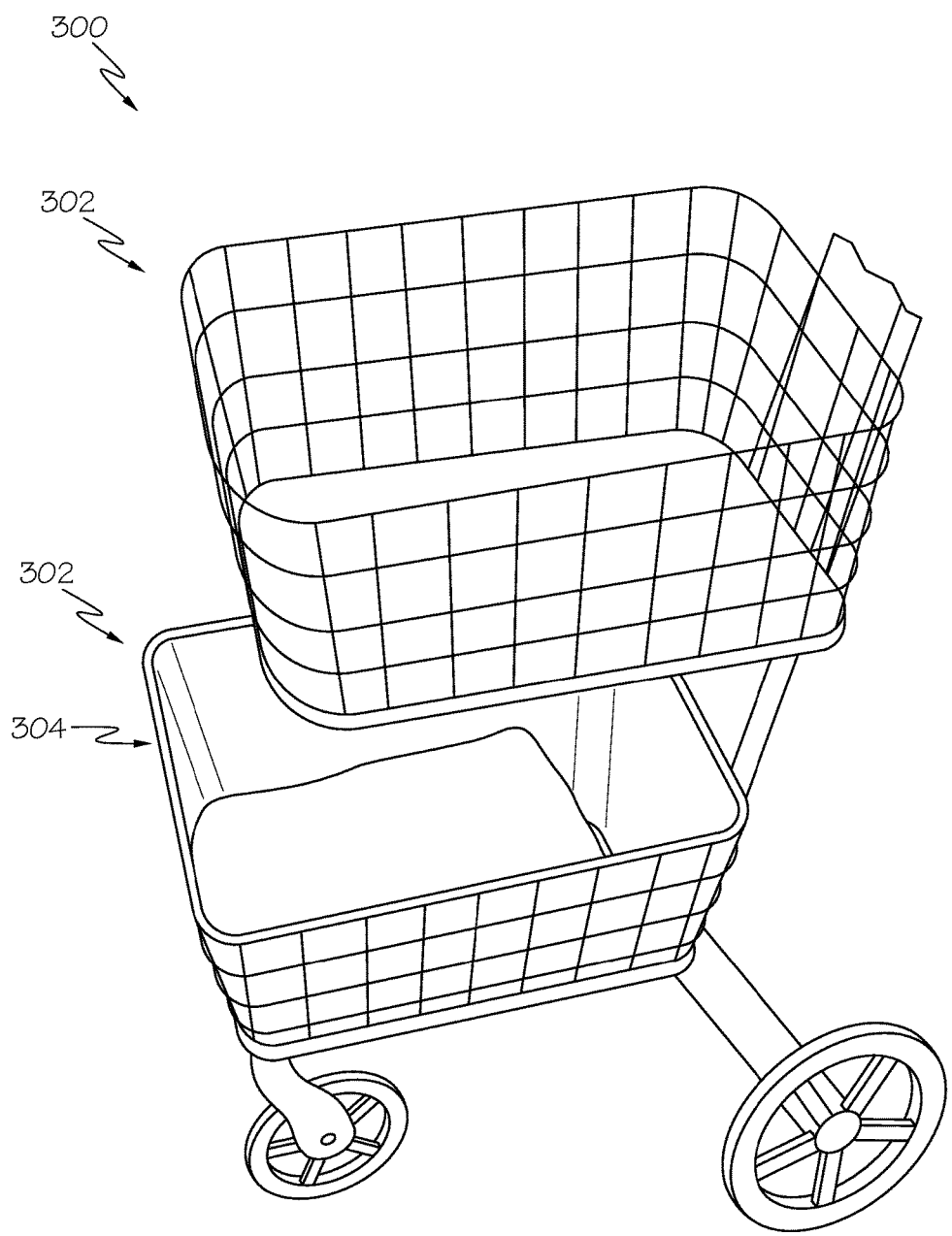
FIG. 3 is an exemplary embodiment of an RFID-enabled retail carriage having a removable carriage basket.

Turning now to exemplary FIG. 3, FIG. 3 may show an exemplary embodiment of an RFID-enabled retail carriage 300 having a plurality of baskets 302 and having a RFID-enabled retail carriage basket 304 set in the lower basket 302 of the retail carriage 300. In an exemplary embodiment, one or more goods may be disposed within the RFID-enabled retail carriage basket 304. These goods may have RFID tags which may be read by the RFID-enabled retail carriage basket 304, indicating that they have been placed in the cart.

Figure 4:
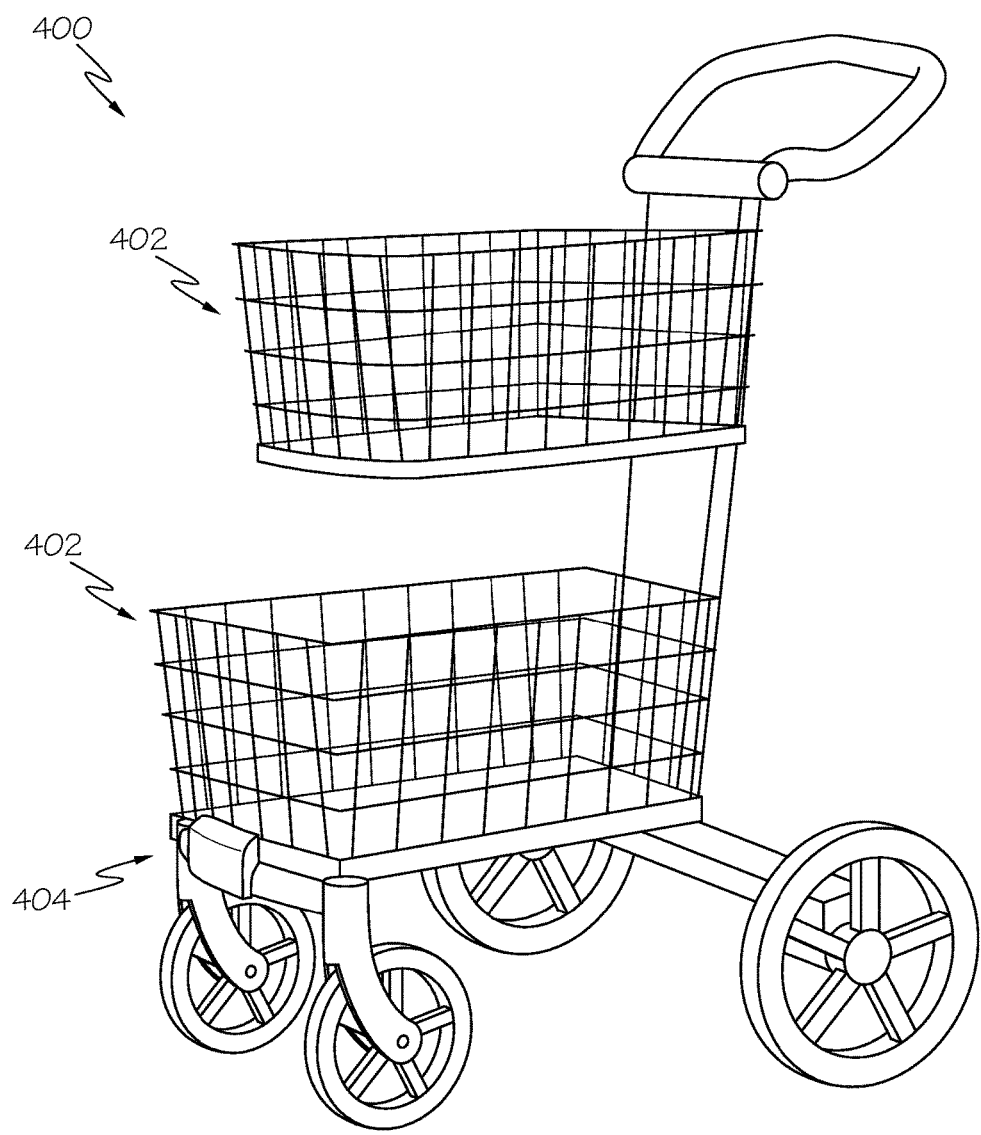
FIG. 4 is an exemplary embodiment of an RFID-enabled retail carriage having a removable carriage basket.

Turning now to exemplary FIG. 4, FIG. 4 may show an exemplary embodiment of an RFID-enabled retail carriage 400 having a plurality of baskets 402 and having a RFID-enabled retail carriage tray 404 set in the lower basket 402 of the retail carriage 400. In an exemplary embodiment, the RFID-enabled retail carriage basket 404 may not have any vertical walls; for example, in an exemplary embodiment, a RFID-enabled retail carriage basket 404 may be formed from only a lower portion of the RFID-enabled retail carriage basket 404 having an antenna disposed therein, such that the RFID-enabled retail carriage basket 404 is a tray that can be mounted under a basket of the retail carriage 400. In an exemplary embodiment, the existing basket 402 of the retail carriage 400 may block RF transmissions sufficiently for vertical walls to be unnecessary; in another exemplary embodiment, the antenna of the RFID-enabled retail carriage basket 404 may be sufficiently near-field as to permit the reading of the RFID tags of goods a user has placed in the cart, without risking reading RFID tags of merchandise that the user simply happens to pass by in the cart.

Figure 5:
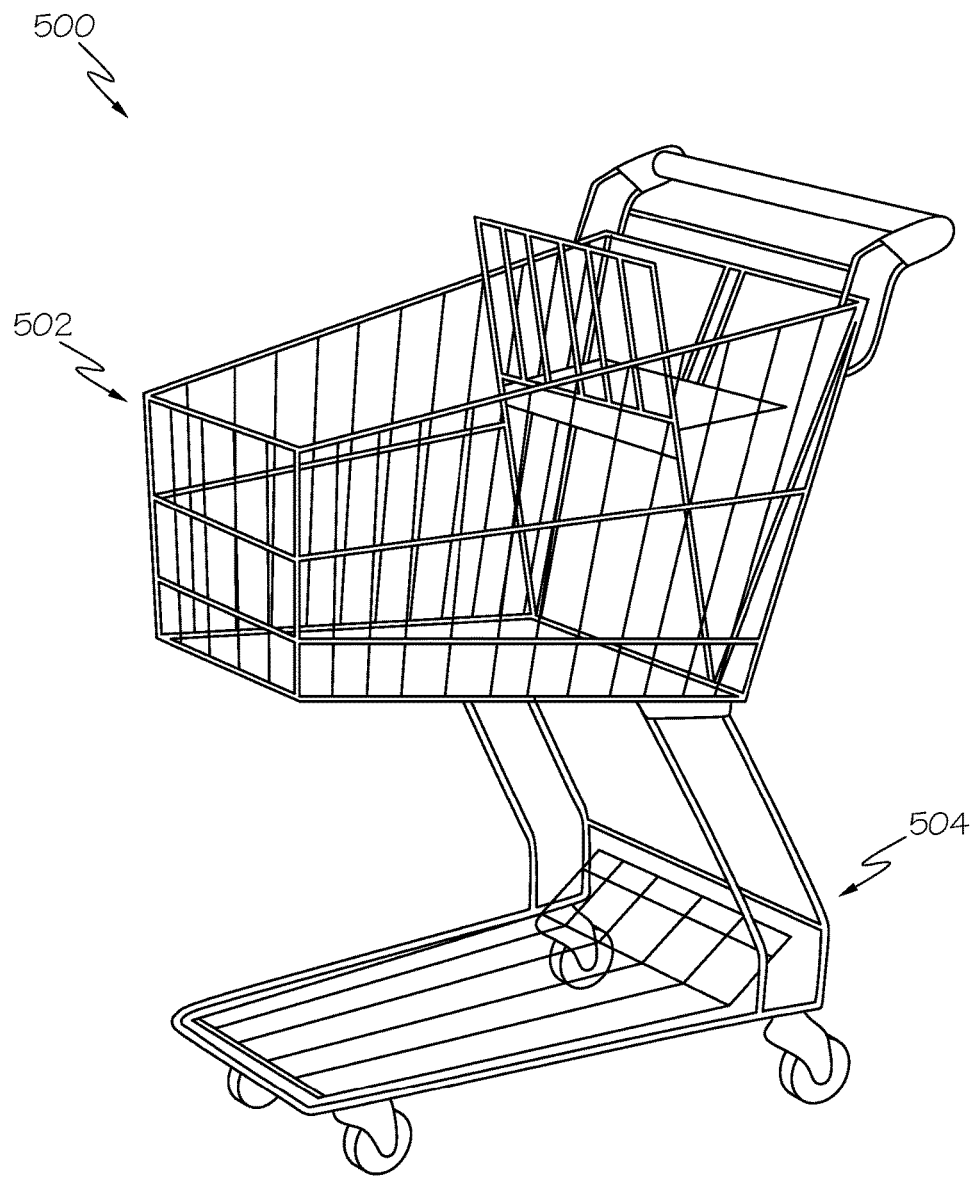
FIG. 5 is an exemplary embodiment of an RFID-enabled retail carriage.

Turning now to exemplary FIG. 5, FIG. 5 may show an exemplary embodiment of a retail carriage 500 in a first stage of being refitted with an RFID system. According to an exemplary embodiment, an RFID system may be placed within the basket 502 of a retail carriage. One or more cables 504, which may be power or data cables (or both), may be fed out of the basket 502 of the retail carriage 500, and may be connected to a host device.

Figure 6:
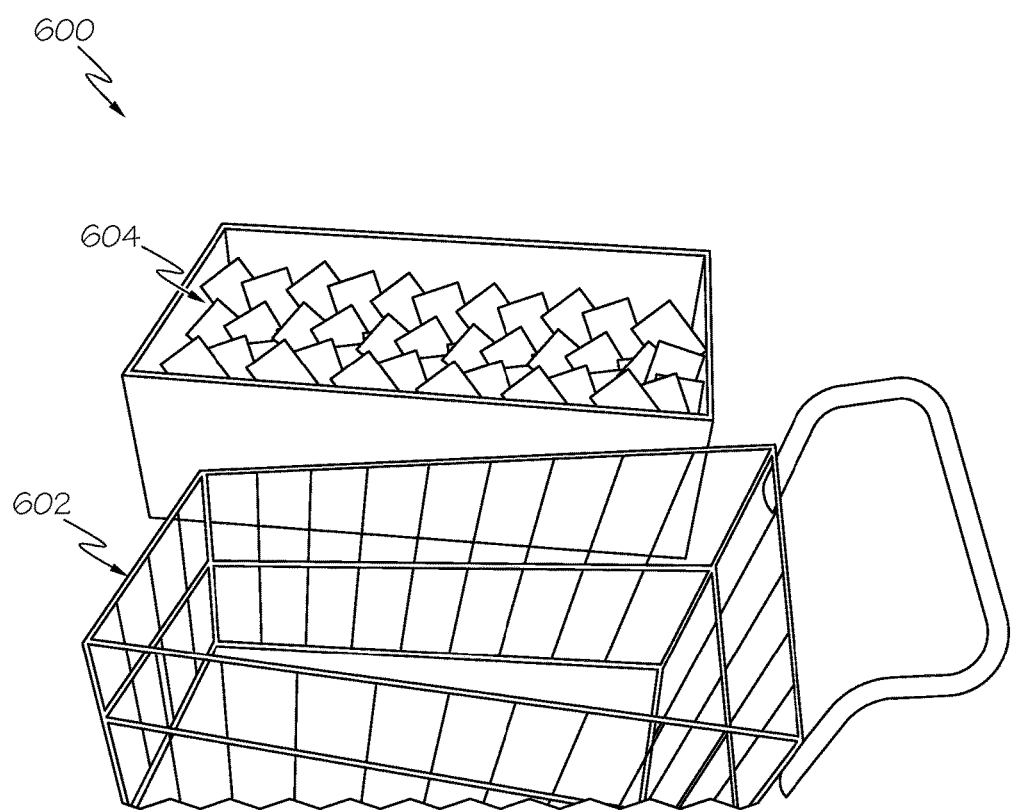
FIG. 6 is an exemplary embodiment of an RFID-enabled retail carriage.

Turning now to exemplary FIG. 6, FIG. 6 may show an exemplary embodiment of a retail carriage 600 in such a manner as to demonstrate the advantages of a RFID-enabled retail carriage basket. In an exemplary embodiment, a retail carriage 600 may be placed next to one or more items 604 which have been fitted with RFID tags and which are located outside of the basket 602 of the retail carriage 600. In an exemplary embodiment, the basket 602 of the retail carriage 600 may be sufficiently shielded from RF transmissions that the items 604 located next to the retail carriage 600 are not read by an antenna located within the retail carriage 600.

Figure 7:
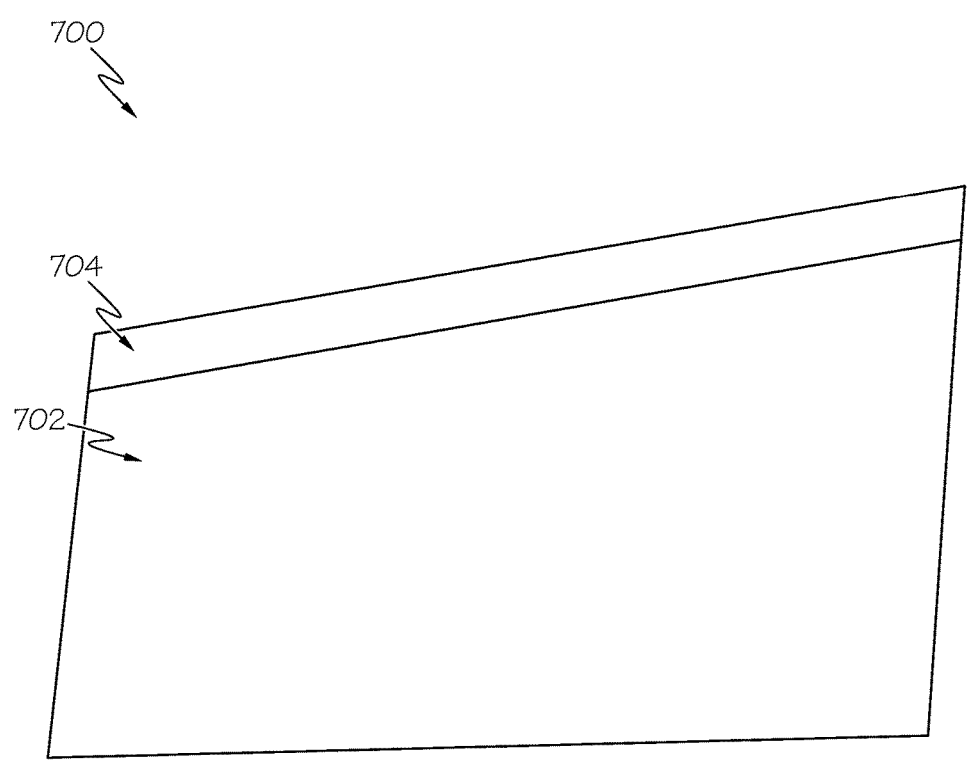
FIG. 7 is an exemplary embodiment of a side panel of an RFID-enabled retail carriage basket.

Turning now to exemplary FIG. 7, FIG. 7 may show an exemplary embodiment of a side panel 700 that may be used to refit a basket of a retail carriage. According to an exemplary embodiment, a side panel 700 may be primarily formed from a material 702 that is configured to mitigate radio frequency transmissions in order to contain RF fields. The side panel 700 may also have a portion, such as a strip of material 704, that may be reflective to RF fields and which may be used to enhance the RF field that may be projected within the cart. In an exemplary embodiment, a strip of material 704 may be Mylar® or any other such material such as may be desired.

In an exemplary embodiment, a side panel 700 may have any of a variety of shapes, which may allow the side panel 700 to be placed within a particular retail carriage. For example, according to an exemplary embodiment, the basket of a particular retail carriage may be sloped or slanted from the front to the back; accordingly, the side panel 700 may be sloped or slanted so as to fit neatly within the retail carriage along the side wall of the basket of the retail carriage, with the end having the reflective strip 704 pointed downward.

Figure 8:
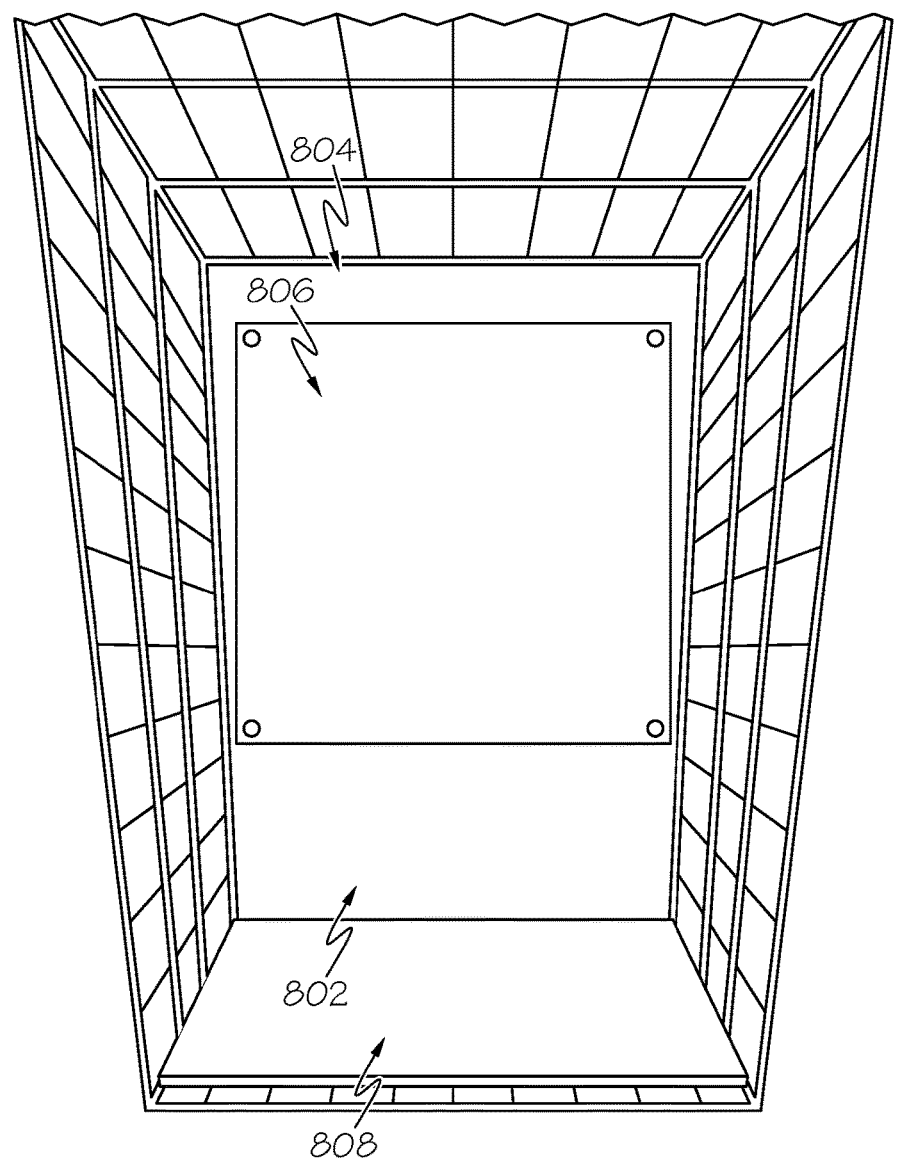
FIG. 8 is an exemplary embodiment of an RFID-enabled retail carriage, with bottom and front panels of the RFID-enabled retail carriage basket shown.

Turning now to exemplary FIG. 8, FIG. 8 may show an exemplary embodiment of an inner view of an RFID-enabled retail carriage 800. According to an exemplary embodiment, the basket 802 of the RFID-enabled retail carriage 800 may include a lower insert 804, which may include an antenna 806, and may include a forward insert 808. In an exemplary embodiment, the RFID-enabled retail carriage basket 802 may not yet be fitted with inserts to the left and right walls; in an exemplary embodiment, inserts such as the insert of FIG. 7 may be added to the RFID-enabled retail carriage 800 in order to complete the RFID-enabled retail carriage basket 802.

In an exemplary embodiment, an antenna 806 may be mounted to a lower insert 804. For example, according to an exemplary embodiment, an antenna 806 may be mounted by screws, other fasteners, adhesive, or by another method in order to keep it secure within the lower insert 804. According to another exemplary embodiment, antenna 806 and lower insert 804 may be separate.

Figure 9:
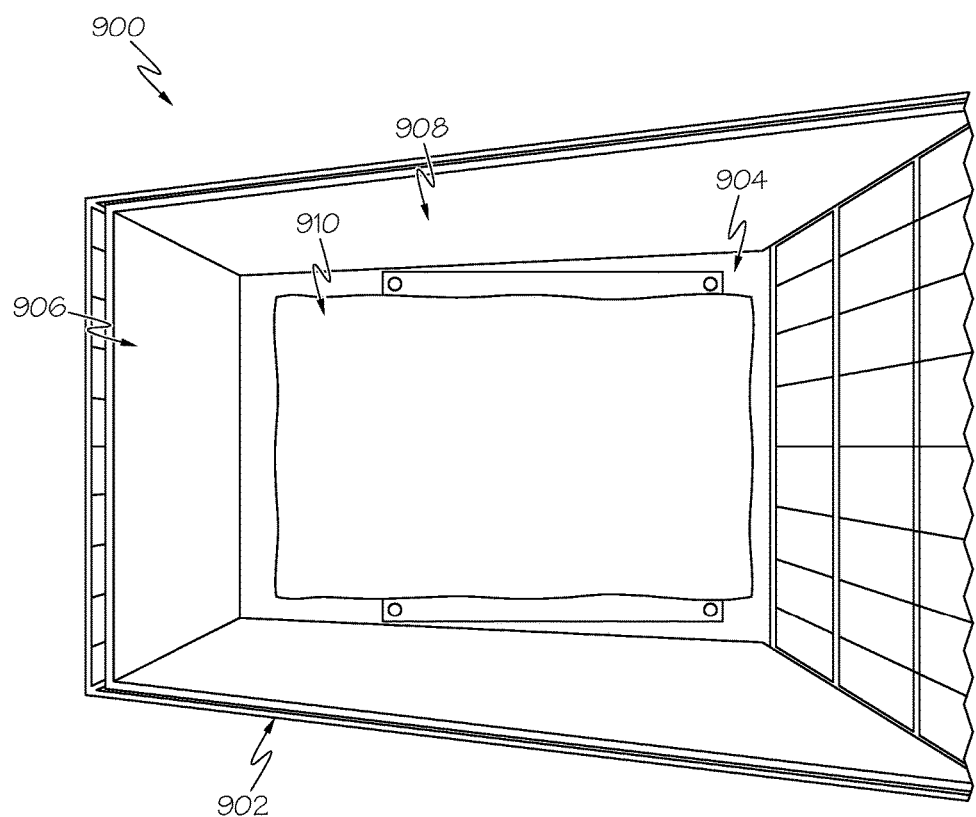
FIG. 9 is an exemplary embodiment of an RIFD-enabled retail carriage.

Turning now to exemplary FIG. 9, FIG. 9 may show an exemplary embodiment of an inner view of an RFID-enabled retail carriage 900. In an exemplary embodiment, the basket 902 of the RFID-enabled retail carriage 900 may include a lower insert 904, a front insert 906, and side inserts 908. In an exemplary embodiment, a rear insert may also be provided for some retail carriages, if desired. In an exemplary embodiment, goods 910 may be stacked on top of the lower insert 904, and the RF tags of the goods 910 may be read by an antenna disposed within the lower insert 904.

Figure 10:
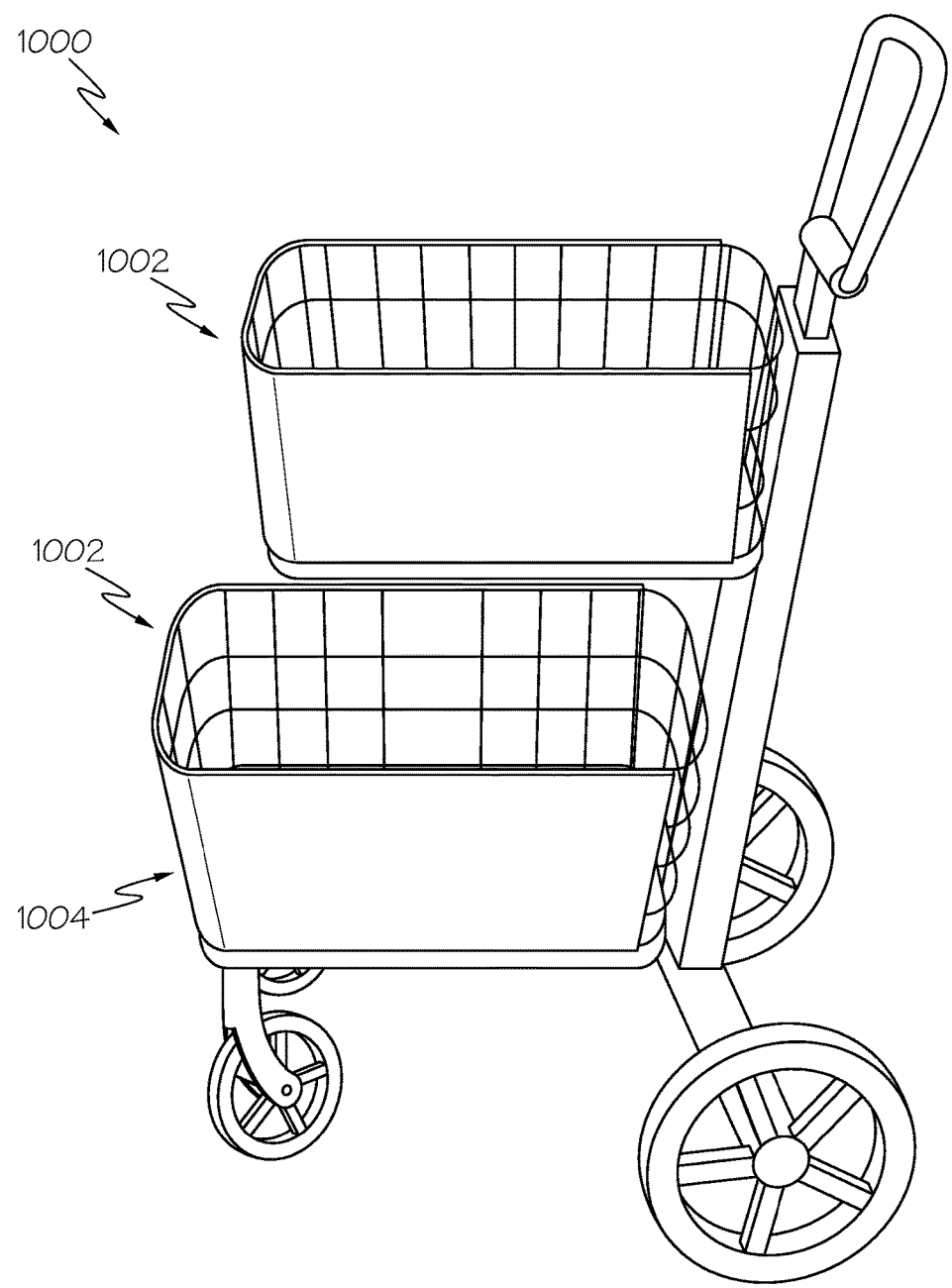
FIG. 10 is an exemplary embodiment of an RIFD-enabled retail carriage.
Figure 11:
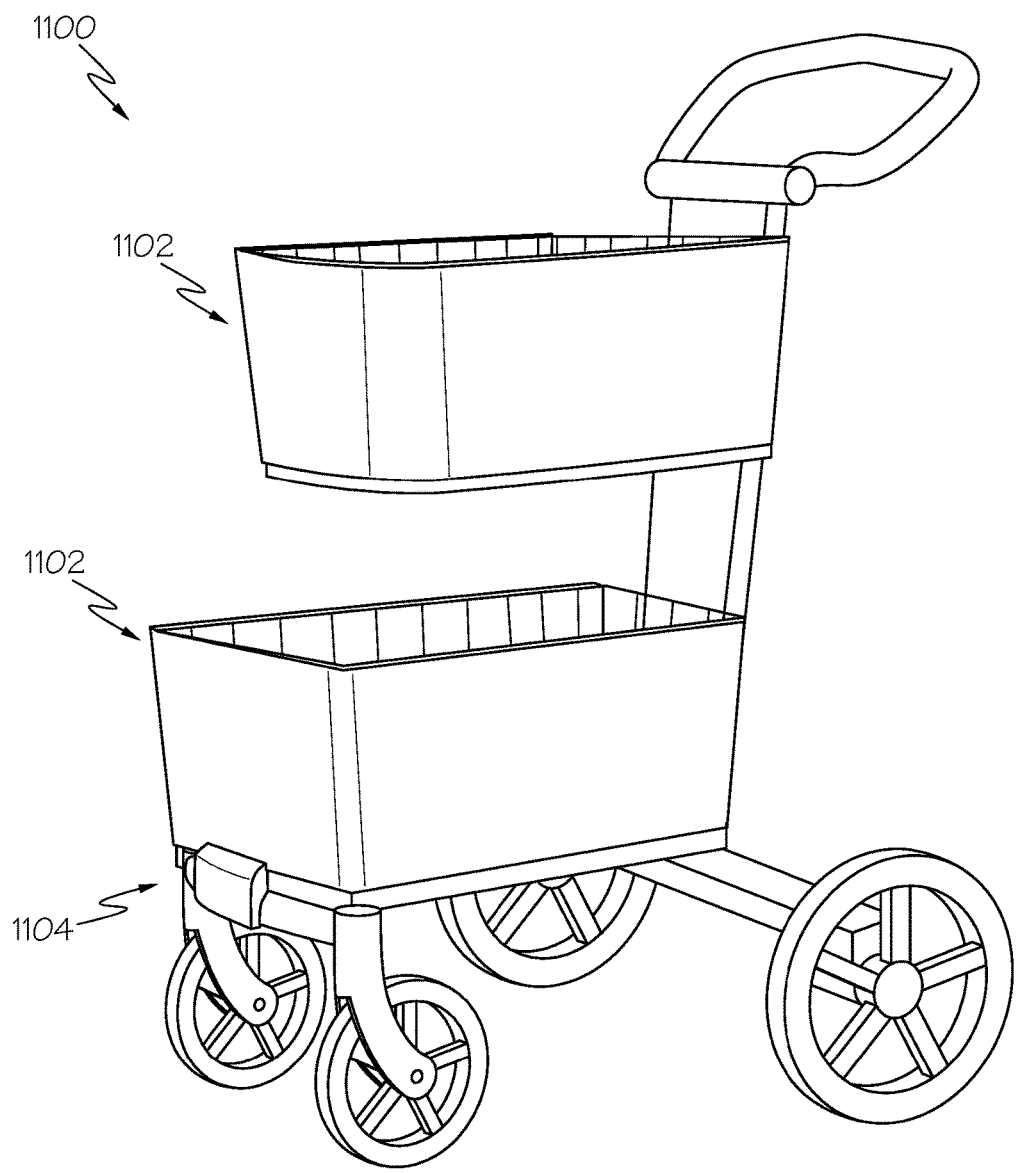
FIG. 11 is an exemplary embodiment of an RIFD-enabled retail carriage.

Turning now to exemplary FIGS. 10 and 11, FIGS. 10 and 11 may show an exemplary embodiment of an RFID-enabled retail carriage 1000, 1100. In an exemplary embodiment, an RFID-enabled retail carriage 1000, 1100 may be formed with a plurality of contiguous baskets 1002, 1102; such baskets 1002, 1102 may be used to hold, for example, small articles. One or more of these baskets 1002, 1102 may be RFID-enabled retail carriage baskets 1004, 1104. In an exemplary embodiment, each basket 1002, 1102 may be an RFID-enabled retail carriage basket 1004, 1104, each of which may be equipped with a near-field antenna; in such an embodiment, the lower part of the top basket may be layered with different material than the lower part of the bottom basket, for example RF-mitigating material.

Figure 12:
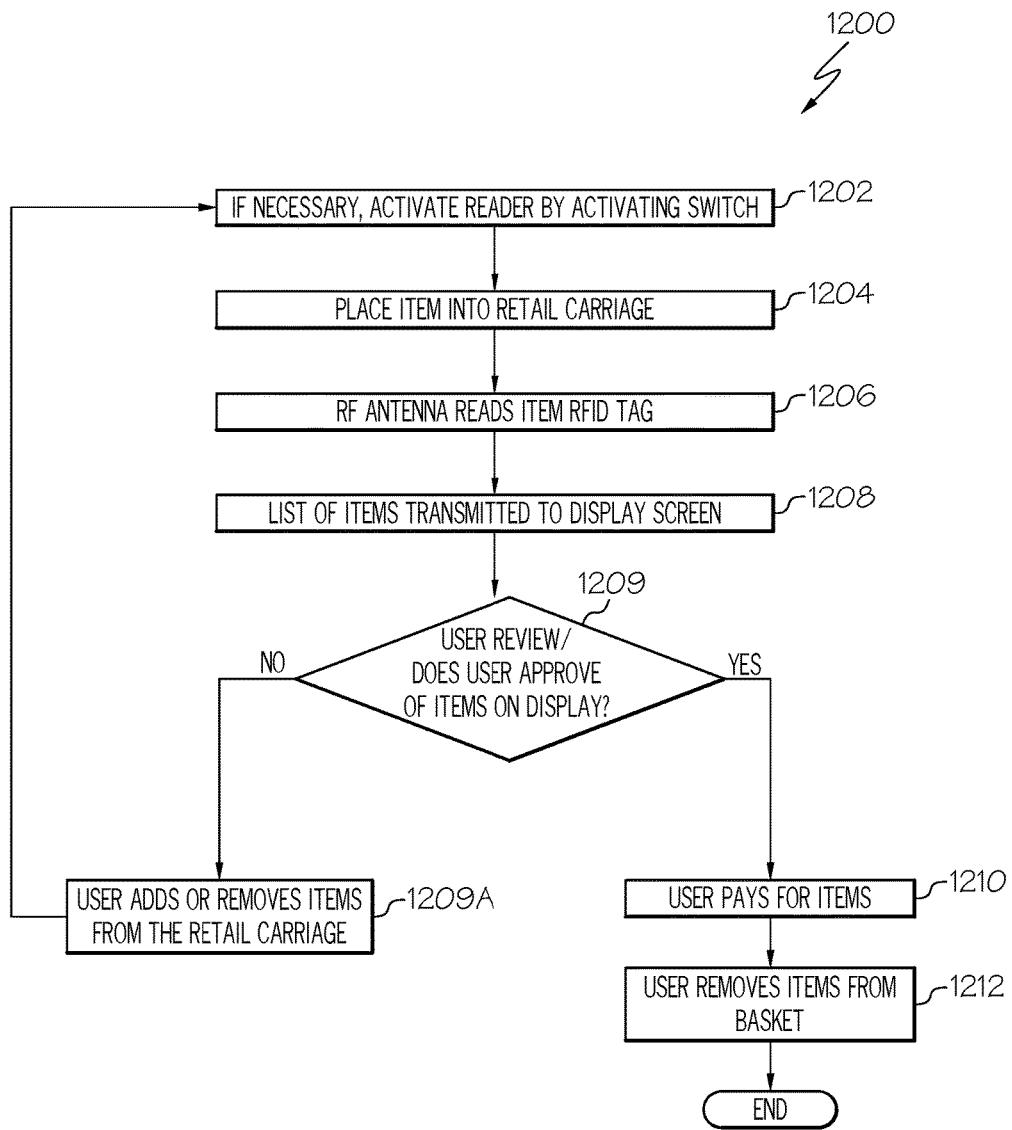
FIG. 12 is a flowchart illustrating an exemplary embodiment of a method of performing scanning of an RIFD-enabled retail carriage.

Turning now to exemplary FIG. 12, FIG. 12 shows an exemplary flowchart depicting a method by which a RFID-enabled retail carriage or container may be used 1200. In a first step 1202, the RFID reader of a RFID-enabled retail carriage may be activated; for example, according to some exemplary embodiments, a micro switch may be provided that turns off the RF antenna that functions as a reader in order to save power, such as when a RFID-enabled retail carriage basket is removed from a retail carriage, and in a first step 1202 the micro switch may be activated, if desired. The present invention also contemplates that, in one embodiment, a switch is not utilized so that a reader functions continuously and is not turned off. In another embodiment, the switch allows for a user to control a power level of the cart, rather than complete turn-off, of functions. In a further exemplary embodiment, the switch may be an IR sensor that responds to the breaking of a continuous or periodic beam. Additionally, the switch may also be a pressure sensitive pad where a predetermined amount of pressure is required before the RF antenna is turned off. Furthermore, the pressure sensitive pad may also be configured to allow for a user to control the power level of the cart, rather than complete turn-off by providing predetermined levels of pressure, that would dictate the power level of the cart. Though the previous embodiments disclose the power level of a cart is being controlled, it is to be understood that the cart may also be a carriage basket, a container, or shopping cart or other retail carriage.

In a next step 1204, a user may place a least one RFID tagged item into the retail carriage. In some exemplary embodiments, such as when the reader is configured to use field sensing motion detection, the motion of the user placing the item into the retail carriage (or another effect of the user placing the item into the retail carriage such as an addition of weight to the retail carriage) may activate the antenna.

In a next step 1206, the RF antenna may read one or more RFID tags of the added item. In an exemplary embodiment, this may allow the RF antenna to determine one or more characteristics about the added item, such as what the added item is. Step 1206 may, if desired, be repeated one or more times, once for every item that is added to the cart (or once for every time items are added to the cart if multiple items are read).

In a next step 1208, a list of the items in the retail carriage may be transmitted to a display screen. Display screen may be any convenient display screen, as desired; for example, the display screen may be a display screen of the smartphone of a user, or may be a display screen associated with a checkout location, or may be any other display screen.

In a next step 1209, a user may be able to review/approve or disapprove the item(s) within the carriage that have been read by the RF antenna. If the user reviews and approves of item(s) on display then a next step 1210 is initiated. If a user reviews and disapproves of the item(s), a user may add or remove item(s) from the retail carriage 1209A and a next step 1202, 1204 or 1206 may be initiated if an item(s) was added or a next step 1202 or 1206 if an item(s) was removed. The method then proceeds continuously to the next steps as shown in FIG. 12. In an exemplary embodiment the RF antenna may automatically re-read the item RFID tag(s) at step 1206 as item(s) are removed, thereby allowing a user to skip steps 1202 and 1204 w. In an exemplary embodiment, this allows the RF antenna to not only determine one or more characteristics about the added item again, but also allows the user to remove an item from the carriage in the event that the item is no longer desired by the user. The method Step 1204 (continuing through the rest of the method steps) may, if desired, be repeated one or more times, once for every item that is added or removed from the carriage basket, container, or cart (or once for every time items are added to the cart if multiple items are read), that information would be transmitted to the display.

In a next step 1210, a user may be able to pay for the items. For example, according to an exemplary embodiment, a user may display the list of items in the retail carriage on a smartphone by using a particular application, and may be able to pay for all of the items in the retail carriage by using the same application, for example by using stored credit card information. Alternatively, a user may pay for the items at a point-of-sale system operated by the retailer.

In a next step 1212, after the items have been paid for, a user may remove the items from the basket and return the basket to the retailer.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A radio-frequency identification (RFID)-enabled container, comprising:
an enclosure, the enclosure comprising a base and a plurality of walls disposed around a perimeter of the base, the enclosure having at least one opening;
the enclosure further comprising a layer of radio frequency wave reflecting material coupled to an outside surface of the base;
each of the plurality of walls comprising a strip of radio frequency wave reflecting material coupled to a lower portion of an outside surface of the wall, and a layer of radio frequency wave mitigation material coupled to a portion of the outside surface of the wall not covered by the radio frequency wave reflecting material;
the base comprising a near-field radio-frequency antenna, the radio-frequency antenna pointed in a direction of the at least one opening, the radio-frequency antenna communicatively coupled to a host device, the host device comprising a processor, a memory, and a power supply.

2. The container of claim 1, further comprising a display communicatively coupled to the host device.

3. The container of claim 2, wherein the display is a touch screen.

4. The container of claim 1, wherein the radio-frequency antenna is connected to the host device by a combination data and power cable comprising at least one of a USB connection or a power-over-Ethernet connection.

5. The container of claim 1, wherein the radio frequency wave reflecting material and the radio frequency wave mitigation material are coupled to the enclosure by lamination.

6. The container of claim 1, further comprising a field sensing motion detector configured to activate the antenna for a predetermined time period after motion in the retail carriage basket has been detected, and configured to deactivate the antenna after the predetermined time period.

7. The container of claim 1, further comprising a micro switch, the micro switch configured to activate the antenna when the retail carriage basket is placed in a retail carriage and configured to deactivate the antenna when the retail carriage basket is removed from the retail carriage.

8. The container of claim 1, wherein the radio frequency wave reflecting material comprises Mylar.

9. The container of claim 1, wherein the antenna is disposed within a hole in the base and is secured to the base by at least one of a fastener or adhesive.

10. The container of claim 1, wherein the power supply comprises a rechargeable battery pack, and further comprises a battery charger.

11. The container of claim 1, wherein the base and the plurality of walls are constructed as a single part.

12. The container of claim 1, wherein the base and one or more of the plurality of walls are distinct parts, each part being separately coupleable to the container.

13. A retail carriage, comprising:
   an RFID-enabled retail carriage basket insert, comprising:
      an enclosure, the enclosure comprising a base and a plurality of walls disposed around a perimeter of the base, the enclosure having at least one opening;
      the enclosure further comprising a layer of radio frequency wave reflecting material coupled to an outside surface of the base;
      each of the plurality of walls further comprising a strip of radio frequency wave reflecting material coupled to a lower portion of an outside surface of the wall, and a layer of radio frequency wave mitigation material coupled to a portion of the outside surface of the wall not covered by the radio frequency wave reflecting material;
      the base comprising a near-field radio-frequency antenna, the radio-frequency antenna pointed in a direction of the at least one opening, the radio-frequency antenna communicatively coupled to a host device, the host device comprising a processor, a memory, and a power supply; and
   a retail carriage basket, the RFID-enabled retail carriage basket insert disposed within the retail carriage basket.

14. The retail carriage of claim 13, wherein the RFID-enabled retail carriage basket insert is removably disposed within the retail carriage basket.

15. The retail carriage of claim 14, further comprising a micro switch, the micro switch configured to activate the antenna when the retail carriage basket is placed in the retail carriage and configured to deactivate the antenna when the retail carriage basket is removed from the retail carriage.

16. The retail carriage of claim 13, further comprising a display communicatively coupled to the host device.

17. The retail carriage of claim 13, further comprising a field sensing motion detector configured to activate the antenna for a predetermined time period after motion in the retail carriage basket has been detected, and configured to deactivate the antenna after the predetermined time period.

18. The retail carriage of claim 13, further comprising a second retail carriage basket located directly above the retail carriage basket.

19. The retail carriage of claim 13, wherein the base and one or more of the plurality of walls are distinct parts, each part being separately coupled to the retail carriage.

20. A method of using an RFID-enabled container comprising the steps of:
   providing at least one RFID tagged item and the RFID-enabled container having a display and a base including a near-field radio-frequency antenna, the radio-frequency antenna pointed in a direction of at least one opening of the RFID-enabled container;
   providing a reader;
   placing the at least one item into the RFID-enabled container;
   reading the item; and
   transmitting information to a display screen of the RFID-enabled container.

* * * * *